(No Model.) 3 Sheets—Sheet 1.

F. M. WOODS.
FANNING MILL.

No. 537,374. Patented Apr. 9, 1895.

Witnesses
Geo. E. Frech.
Joseph P. Burg

Inventor
Frank M. Woods
By Lehmann Pattison & Nesbit
attys.

(No Model.) 3 Sheets—Sheet 2.

F. M. WOODS.
FANNING MILL.

No. 537,374. Patented Apr. 9, 1895.

WITNESSES
Geo. C. Fuchs,
Joseph P. Burg

INVENTOR
Frank M. Woods
By Lehmann Pattison & Wright attys.

(No Model.) 3 Sheets—Sheet 3.

F. M. WOODS.
FANNING MILL.

No. 537,374. Patented Apr. 9, 1895.

WITNESSES
Geo. E. Frech,
Joseph P. Burg.

INVENTOR
Frank M. Woods
By Lehmann Patrich Wecht
attys.

UNITED STATES PATENT OFFICE.

FRANK M. WOODS, OF LYONS, KANSAS.

FANNING-MILL.

SPECIFICATION forming part of Letters Patent No. 537,374, dated April 9, 1895.

Application filed March 23, 1894. Serial No. 504,670. (No model.)

*To all whom it may concern:*

Be it known that I, FRANK M. WOODS, of Lyons, in the county of Rice and State of Kansas, have invented certain new and useful Improvements in Fanning-Mills; and I do hereby declare the following to be a full, clear, and exact description of the invention, such as will enable others skilled in the art to which it pertains to make and use it, reference being had to the accompanying drawings, which form part of this specification.

This invention relates to certain improvements in fanning mills.

The object of the invention is to provide an improved fanning mill or machine simple, durable and effective in construction and by which grain, seed or the like can be easily, quickly and thoroughly cleaned, separated and distributed.

The invention consists in certain novel features of construction and in combinations of parts more fully and particularly pointed out and described hereinafter.

Figure 1:
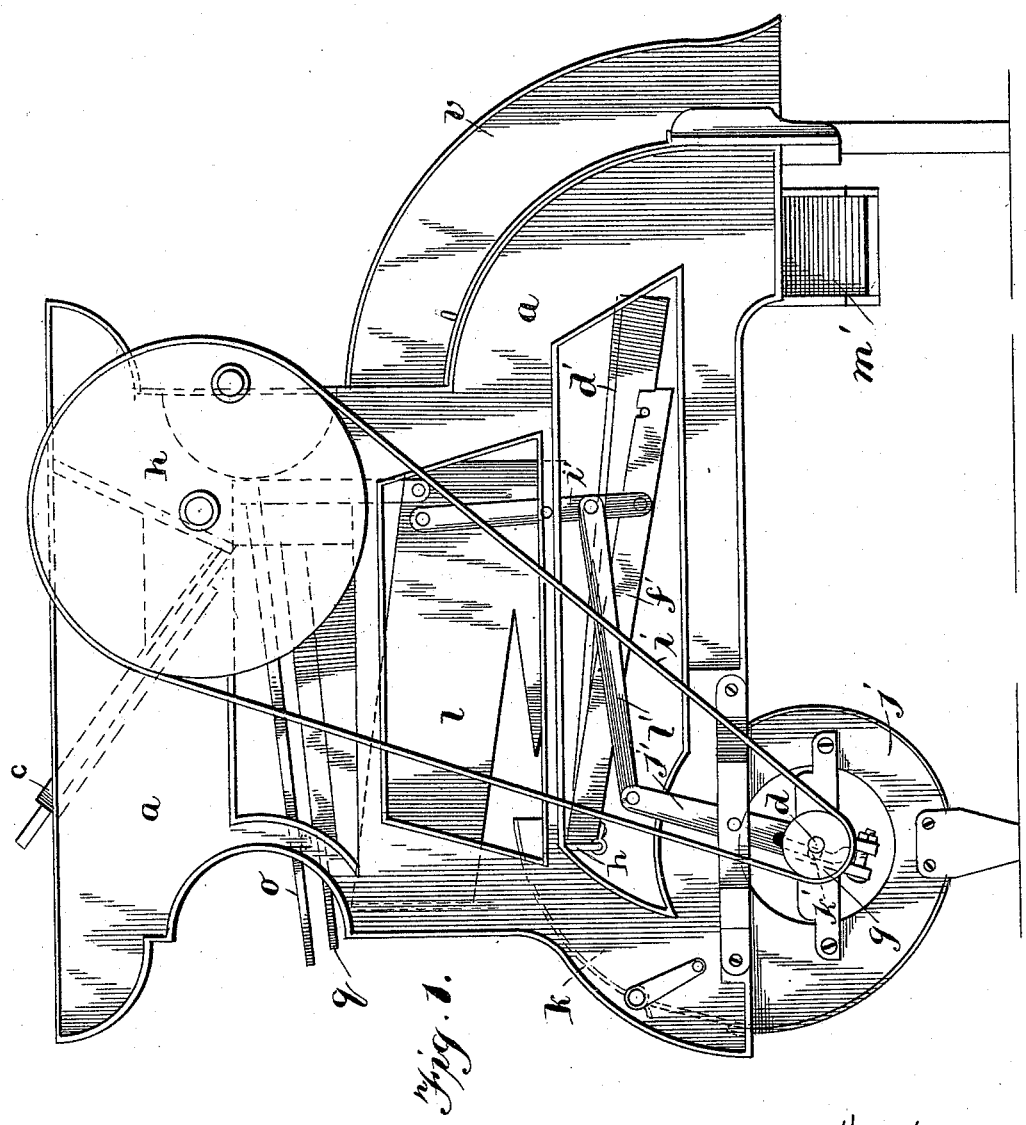
Figure 2:
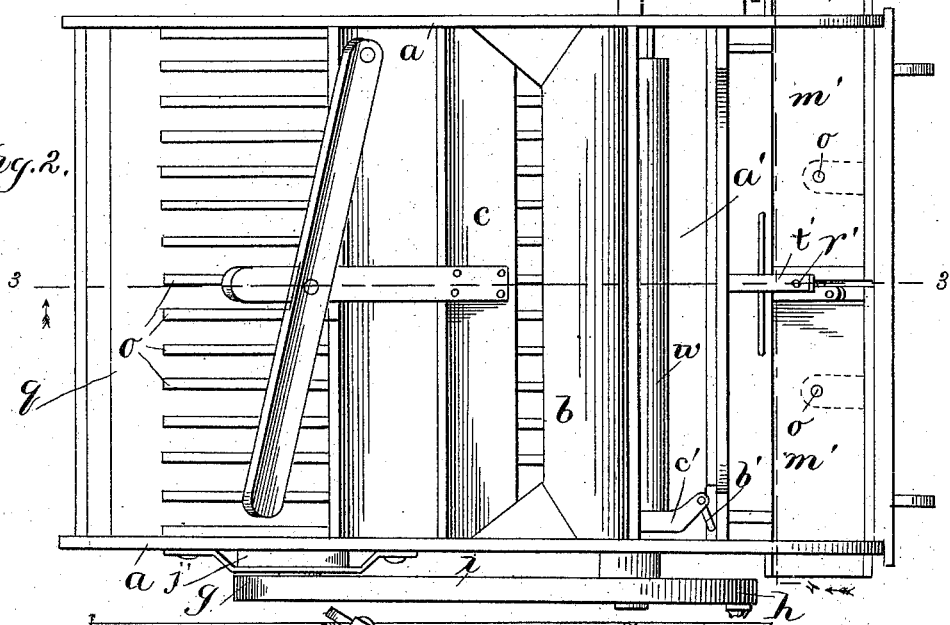
Figure 3:
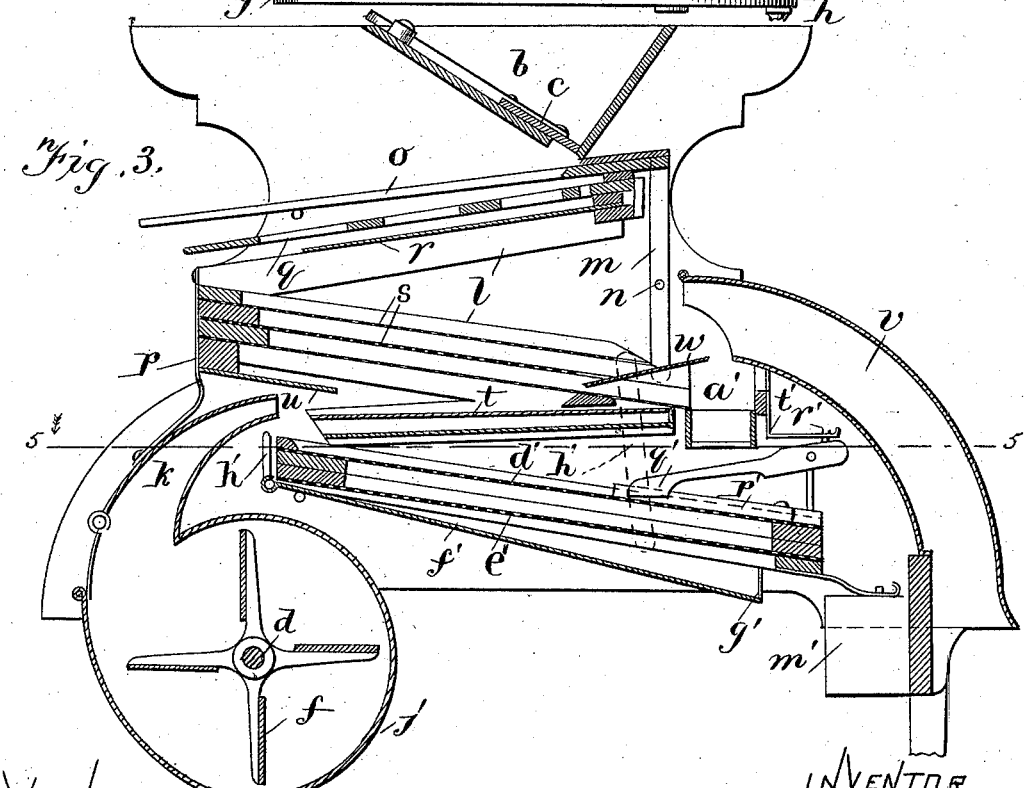
Figure 5:
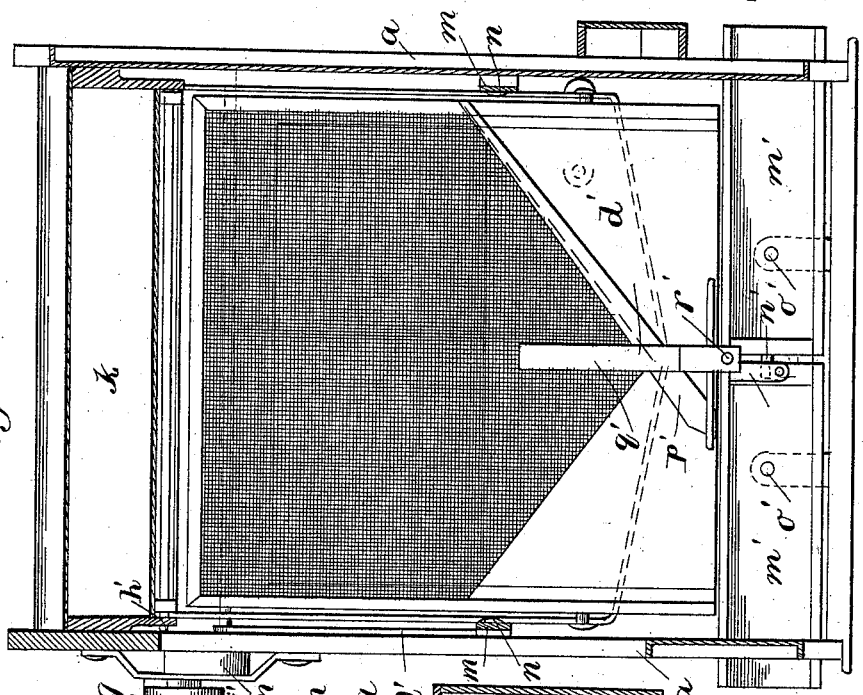
Figure 4:
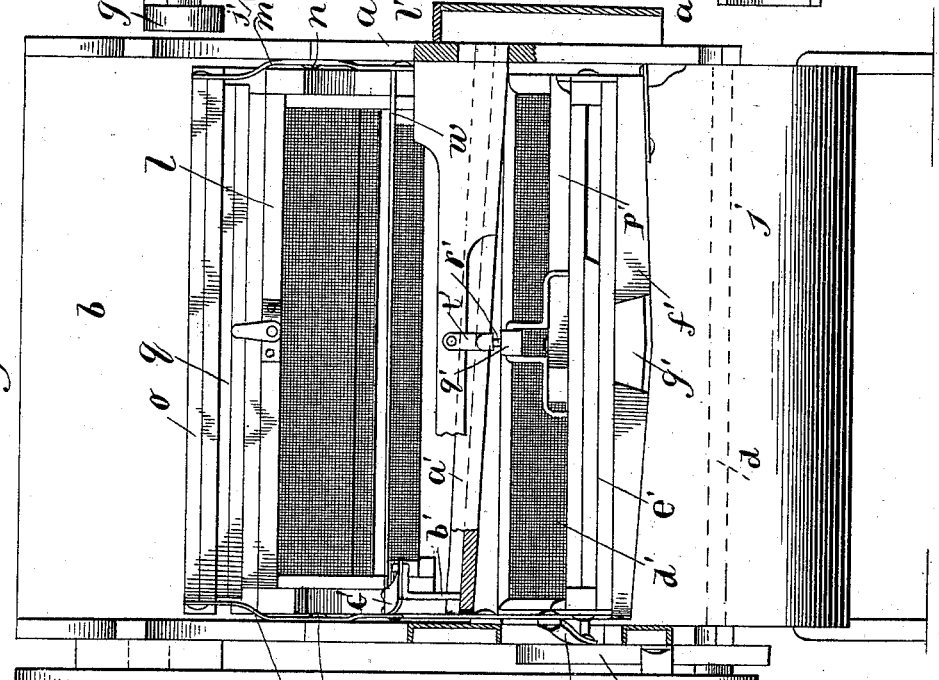

Referring to the accompanying drawings, Figure 1 is a side elevation of the machine with parts shown in dotted lines. Fig. 2 is a top plan view with the rear dust discharge removed. Fig. 3 is a central vertical sectional view on the line 3—3 Fig. 2. Fig. 4 is a vertical sectional view on the line 4—4 Fig. 2. Fig. 5 is a horizontal sectional view taken on the line 5—5 Fig. 3.

In the drawings —a— is the frame of the machine suitably constructed and supported, usually comprising the two sides connected and braced and at its top having the transverse feed hopper —b— provided with any suitable controlling valve or gate —c—.

—d— is the fan shaft extending transversely of and journaled in the lower front portion of the machine and carrying the fan —f—, and the driving pulley —g— at its outer end. The fan shaft can be driven from the main driving pulley —h— through the medium of the belt or sprocket chain —i—. The driving pulley can be provided with any suitable handle for driving.

—j— is the casing for the fan usually provided with a controlling door or damper, and having the upwardly and rearwardly extending air discharging mouth or conduit —k—.

—l— is the vibrating screen box suspended within the frame at its rear end by the vertical levers —m—, at their lower ends pivoted to the sides of said box and at points above the box fulcrumed as at —n— to the sides of the frame and at their upper ends above the fulcrum points pivotally joined to the rear end of a series of downwardly and forwardly inclined fingers —o— arranged a short distance apart and secured together at their rear ends by a cross bar and sliding on supports at their front ends. These fingers are arranged immediately beneath the discharge from the hopper and the seed or grain from the hopper must fall between the fingers, whereby the fingers remove and separate straw, chaff, &c., from the grain and discharge the same at the front of the machine.

The front end of the screen box is supported by the plate springs —p— suitably secured to the frame of the machine or to the fan casing and to the front end of the screen box so as to permit said box to vibrate freely but without sharp jars.

—q— is a corn screen removably resting on the top of the screen box beneath the said fingers and preferably consisting of a plate having large openings or large meshes and designed to separate corn from smaller grain, the corn being discharged from the lower front edge of said corn screen.

Beneath the corn screen the screen box is provided with the floor —r— inclined downwardly and forwardly so that the grain dropping thereon is discharged from the lower front edge thereof on the upper portion of the series of rearwardly inclined screens —s— suitably secured together and removably arranged in the screen box. Beneath these screens —s— the screen box is provided with the forwardly inclined floor —t— and the deflector —u— above the same so arranged that the blast of air from the mouth of the fan casing is directed upwardly to the under side of the lower screen —s— and up through the screens to blow and separate all light dust, dirt, &c., from the grain and carry the same into the upper end of a dust chute or discharge —v— having its upper open end arranged at the rear end of the screen box at the rear of said screens —s— and from thence extending downwardly with its discharge at the lower portion of the rear end of the frame. This dust chute is preferably composed of side pieces and the upper and lower walls, the entire chute being removably secured to the rear edges of the sides of the main frame and serving as a cover for the rear of the machine which is of great utility and advantage, particularly in windy weather, and furthermore the dust is discharged at the bottom of the machine. This dust chute is shown the same width as the machine frame so as to entirely close the rear end thereof below the upper end of the chute. The inner and outer walls of the chute preferably curve outwardly and downwardly as shown in Fig. 3. The chute can be removably secured on the end of the frame in any suitable manner, as by removable fastenings (shown clearly in Fig. 1) passed through the side flanges of the chute into the edges of the machine sides. The rear ends of the screens —s— are provided with a deflector —w— arranged to carry the dust and air blast into the upper end of the dust chute.

—a'— is a transverse longitudinally reciprocating grain discharge trough or chute supported by the main frame beside a cross bar thereof and at the rear end of the lower screen —s— so that the grain, &c., dropping from the rear edges thereof will fall into said trough which is preferably inclined toward one end where the grain can pass out through an opening in the side wall of the frame. This trough is reciprocated by a vertical crank shaft —b'— journaled in a cross bar of the main frame and having a crank pivotally connected with the frame and another crank arm pivotally connected with the vibrating screen by a link —c'—.

—d'—e'— are a pair of screens secured together and inclined downwardly and rearwardly and supported beneath the screen box so that the material dropping from the lower rear edge of the floor —t— will drop on the upper end of the screen —d'—. These screens —d'—e'— rest in and are supported by a rearwardly and downwardly inclined waste pan —f'— extending beneath all open portions of the screens to catch the material dropping through the same, and having the raised side edges inclined toward each other at the lower end of the pan to guide all the material in the pan to the discharge mouth —g'— of the pan. This pan is mounted at its front end in a swinging hanger —h'— suitably supported in the frame of the mill, and the rear end of the pan is supported by the vertical levers —i'— at their lower ends pivoted to the pan, and fulcrumed to the main frame between their ends and at their upper ends pivoted to the screen box. By this means the pan is loosely held so as to freely vibrate.

—j'— is a vertically disposed lever fulcrumed to the main frame between its ends and at its lower end confined to a crank or eccentric —k'— of the fan shaft and at its upper end pivotally connected by a link —l'— with one of the levers —i'— at a point beneath the fulcrum thereof. Thus it will be readily observed that the vibrating of the lever —j'— by the crank shaft will vibrate the waste pan, which through the medium of the levers —i'— will vibrate the screen box in an opposite direction, and the levers m, will give a long stroke or vibration to the series of fingers, from the screen box.

—m'—m'— are two delivery spouts inclined downwardly and transversely in opposite directions to opposite sides of the machine from the center thereof. These spouts are arranged in a plane below the lower edge of the two screens —d'—e'— to catch the grain dropping therefrom. The two spouts are loosely joined at their upper inner ends by a pin or the like —n'— and at a point between its ends each spout is pivoted at —o'— to swing or vibrate laterally. The upper ends of the spouts are loosely joined to the said screens —d'—e'— by an arm so that the spouts are vibrated from said screens as is clearly evident.

—p'— is a swinging gate or valve at its outer or lower end pivoted to the center of the outer lower portion of the upper screen —d'— and from thence extending upwardly on the screen and of such length as to be capable of swinging in either direction to the side edge of the screen and thereby direct the contents of the screen into either of the spouts —m'— desired. The lower screen —e'— is also partially closed at the end so as to discharge into one of the spouts —m'— only. By this arrangement the grain from these two screens can be separated and discharged to opposite sides of the machine or the grain from both screens can be discharged into one spout and taken off at the same side of the machine.

—q'— is a thumping or jarring or knocking device for the screens —d'—e'— consisting of a short lever pivoted at its outer end to an upright from the lower end of the screen —d'— so as to permit its inner free end vertical play so as to strike the upper surface of the screen. A vertical pin —r'— extends up from the outer end of this lever and passes loosely through an arm —t'— from a cross bar of the main frame so that as the screens —d'—e'— vibrate said lever is rocked up and down by the pin confined in said stationary arm. The screens just mentioned are thus repeatedly struck and jarred and prevented from clogging.

It should be observed that the screens should be properly graded for the purposes intended and the machine geared to give the proper vibrations to the various screens and parts.

It is evident that various changes might be made in the forms, arrangements and constructions of the parts described without departing from the spirit and scope of my invention. Hence I do not wish to limit myself to the exact constructions herein set forth, but consider myself entitled to all such changes as fall within the spirit and scope of my invention.

What I claim is—

1. In a fanning mill, the combination of the frame, a screen therein, means to vibrate said screen, the swinging gate on the screen to direct the grain to either end of the lower discharge edge of the screen, the two spouts beneath the discharge edge of the screen extending downwardly and laterally in opposite directions from the central portion of said edge, each spout mounted on a pivot to vibrate laterally, a loose connection between the spouts to cause them to vibrate together, and a connection from the screen to one of the spouts to vibrate them from the screen, substantially as shown and described.

2. In a fanning mill, the combination of a frame, a vibrating screen box having operating means, upright levers having their lower ends pivoted to the screen box, the downwardly inclined plate $q$ having grain openings and resting on the top of the screen box with its discharge edge extending beyond the front end of the box and the series of parallel downwardly and forwardly inclined fingers $o$ located a short distance apart and arranged between the screen box and the feed hopper and secured together at their inner ends by a rigid cross bar pivoted to the upper ends of said levers so as to vibrate the fingers longitudinally, oppositely to the screen box the lower ends of the fingers projecting beyond the lower edge of the plate $q$, substantially as shown and described.

3. In a fanning mill, the combination of the frame, the fan having its casing provided with an upwardly and rearwardly extending mouth, the screen box having vibrating means, said box having the downwardly and rearwardly inclined screens, the downwardly and rearwardly inclined deflector $u$, beneath the front ends of the screens and above said discharge mouth, the floor $t$ beneath the screens and said deflector so that the deflector and the floor direct the blast upwardly and rearwardly through the screens, and the upwardly and rearwardly inclined deflector $w$, at the rear ends of the screens to carry the dust upwardly and rearwardly as set forth.

4. In a fanning mill, the combination of the frame, the vibratory box therein having operating means, and a discharge at its rear end, the transverse trough reciprocating through one side of the frame and arranged beneath said discharge from the box, a cross bar on the frame behind said trough, a vertical shaft mounted on said cross bar and having a crank at its lower end connected to said trough and a crank at its opposite end mounted in an arm from the box, substantially as shown and described.

5. In a fanning mill, the combination of a frame, a screen box therein, a grain trough at the rear end thereof, to receive the grain from the rear edge thereof, said box having a bottom discharge, the pan beneath said box supported by hangers at one end and having a discharge from its lower edge, levers fulcrumed to the frame and pivoted to said box and to the pan, the screens on said pan having the double discharges, and the two troughs at the rear edge thereof connected and vibrated therefrom, said two troughs inclined downwardly and laterally from substantially the center of the rear discharge edge of said screen, each trough mounted to rock laterally, and the two troughs connected loosely together substantially as shown and described.

In testimony whereof I affix my signature in presence of two witnesses.

FRANK M. WOODS.

Witnesses:
F. W. STEWART,
J. H. EBB.